United States Patent [19]

Nieden

[11] 4,120,673
[45] Oct. 17, 1978

[54] APPARATUS FOR SEPARATING GASES FROM LIQUIDS

[75] Inventor: Achim zur Nieden, Cologne, Fed. Rep. of Germany

[73] Assignee: Klockner-Humboldt-Deutz Aktiengesellschaft, Cologne, Fed. Rep. of Germany

[21] Appl. No.: 769,924

[22] Filed: Feb. 18, 1977

[30] Foreign Application Priority Data

Feb. 19, 1976 [DE] Fed. Rep. of Germany ....... 2606673

[51] Int. Cl.² ............................................ B01D 45/16
[52] U.S. Cl. ..................................... 55/205; 55/399; 55/454; 55/457; 209/144; 210/512 R
[58] Field of Search ................ 55/201, 203, 204, 205, 55/454, 456, 457, 459 R, 459 D, 399, 396, 460; 209/144; 210/512 R

[56] References Cited

U.S. PATENT DOCUMENTS

| 1,047,469 | 12/1912 | Wendt | 55/456 |
| 2,228,401 | 1/1941 | Pressler | 55/205 |
| 2,738,070 | 3/1956 | Cottrell | 210/512 R |
| 2,754,970 | 7/1956 | Ross | 210/512 R |
| 2,770,322 | 11/1956 | Banham, Jr. et al. | 55/396 |
| 3,106,334 | 10/1963 | Fogleman et al. | 55/456 |
| 3,771,288 | 11/1973 | Wisman et al. | 55/204 |

Primary Examiner—Frank W. Lutter
Assistant Examiner—David L. Lacey
Attorney, Agent, or Firm—Walter Becker

[57] ABSTRACT

An apparatus for separating gases from fluids, which apparatus includes a closed cylindrical receptacle and a cylindrical insert which divides the interior of the receptacle into an annular outer part and a cylindrical inner part. The outer part is provided with a tangential inlet for the fluid. Near the top, an opening connects the outer part to the inner part, the latter being provided with a ventilation device. The outer annular part is divided in the axial direction by a partition which ascends spirally from the tangential inlet approximately in a complete turn in the direction of the upper end face cover of the receptacle. The connection opening is formed by an annular clearance which extends over nearly the entire circumference of the receptacle. A similar annular clearance at the bottom of the receptacle connects the inner cylindrical part with the outer annular part, the latter having a tangential discharge outlet in this region.

2 Claims, 3 Drawing Figures

APPARATUS FOR SEPARATING GASES FROM LIQUIDS

The present invention relates to an apparatus for separating gases from fluids. This apparatus comprises a closed cylindrical receptacle and a cylindrical insert which divides the interior of the receptacle into an annular outer part and a cylindrical inner part. The outer part is provided with a tangential inlet for the fluid. Near the top, an opening connects the outer part to the inner part, the latter having a ventilation device.

The problem of separating gases from fluid occurs, among others, with lubricating oil of prime movers, especially reciprocating piston internal combustion engines. Normally it suffices that the lubricating oil flows back into a tank or a pan where, as a result of different specific gravities, the gases absorbed by the fluid are separated. With the development of compactly built prime movers, especially reciprocating piston internal combustion engines, the space between the fixed housings and the movable parts of the machines becomes continually smaller, so that an unimpeded return of the lubricating oil to the oil pan is not insured and the lubricating oil is vigorously turned into froth by the moving parts. Further, the lubricating oil is used to cool thermally highly stressed parts, and for this purpose is sprayed through nozzles onto the parts to be cooled. Finally, a particularly vigorous frothing action of the lubricating oil occurs with internal combustion engines which operate in a greatly sloped position and therefore have suction funnels located at numerous places on the crankcase, the frothing action occurring because the respectively higher lying funnels simultaneously draw in air. In order that the lubricating oil effectiveness is not unduly decreased, it is necessary to separate the gas constituents from the lubricating oil.

For the purpose of such separation, an apparatus of the above described type is known from German Offenlegungsschrift No. 2,461,113. According to this publication, a rotational movement is imparted to the lubricating oil in the cylindrical receptacle by means of the tangential inlet. By doing so, the lighter gas constituents are separated inwardly and upwardly and are withdrawn through the connecting opening in the upper region and a ventilating device in the inner part of the insert, while the deformed oil flows into the tank from the lower region of the annular space through openings in the bottom. The degree of separation of the apparatus is only satisfactory if the rotating flow layers do not overlap each other, since overlapping produces shocks and disturbances of the whirl. However, in order to insure that there is no overlapping, a relatively large overall apparatus length is required.

It is an object of the present invention to improve the degree of separation of an apparatus of the above described general type with a smaller overall apparatus volume.

This object and other objects and advantages of the present invention will appear more clearly from the following specification in connection with the accompanying drawing, in which.

Figure 1:
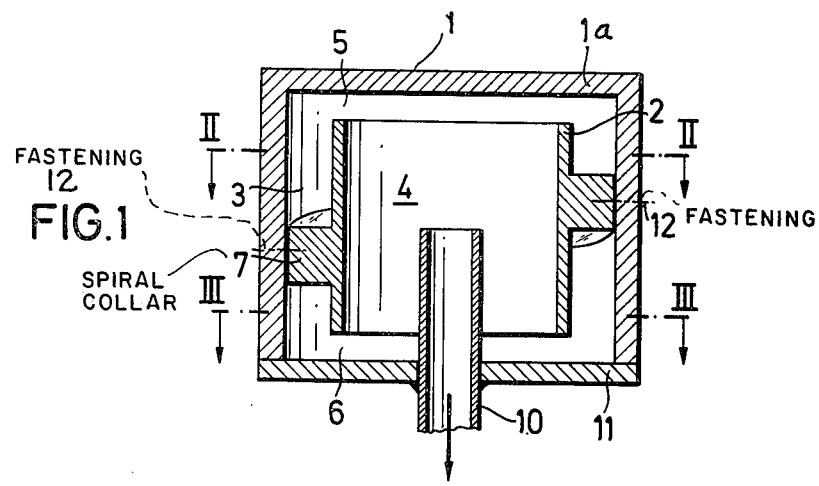
FIG. 1 is a longitudinal section of an apparatus according to the invention.
Figure 2:
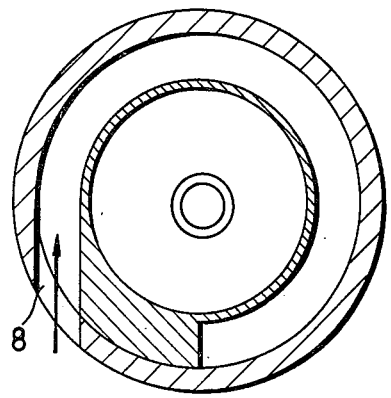
FIG. 2 is a cross section along the line II—II of FIG. 1.
Figure 3:
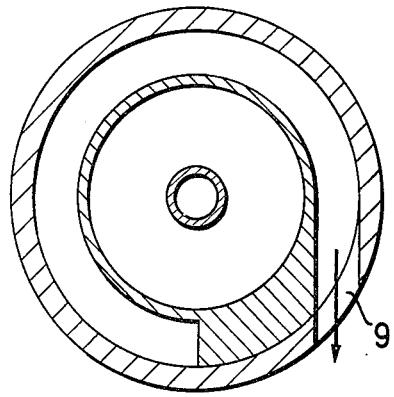
FIG. 3 is a cross section along the line III—III of FIG. 1.

The separation apparatus of the present invention is characterized primarily in that the outer annular part is divided in the axial direction by a partition which ascends spirally from the tangential inlet approximately in a complete turn to the upper end face cover of the receptacle. The connecting opening is formed by an annular clearance which extends over nearly the entire circumference. A similar annular clearance at the bottom of the receptacle connects the inner cylindrical part with the outer annular part, the latter having a tangential discharge outlet in this region.

Pursuant to the apparatus of the present invention, the fluid, for example the lubricating oil, enters the outer annular space of the receptacle through the tangential inlet and ascends by means of the spiral partition as far as the upper edge of the cylindrical insert, over which the fluid flows and forms a fluid film which rotates at an accelerated rate in conformity with the twist or momentum theorem. Out of this fluid film the gas constituents separate easily and quickly and may escape through the ventilating device. The fluid flows down along the inner wall of the cylindrical insert and passes through an annular clearance into the lower part of the annular space, out of which the fluid smoothly flows through a tangential discharging outlet.

The improved degree of separation achieved with the apparatus of the present invention is based essentially upon the uniformity with which the rotating fluid film is formed on the inner wall of the insert, and specifically with a free vortex core, without eccentricity, and over the entire length of the hollow body. The free vortex core, out of which the gas constituents are withdrawn with the aid of a ventilating device, extends over the entire length of the apparatus without entry or exit shock. In this way, the upper surface of the film remains undisturbed, so that improper functioning, in view of which oil gets into the ventilating device or gas gets into the oil outlet, is avoided. In this connection, the optimum comfiguration of the fluid film, the film thickness, and the pitch are automatically adjusted, in fact independent of the throughput and of the oil viscosity. Due to the definitive entry and exit flow, the overall length of the cyclone is very small, since no calming section is needed.

Referring now to the drawing in detail, the closed cylindrical receptacle 1 is provided with a cylindrical insert 2, which divides the interior of the receptacle 1 into an annular outer part 3 and a cylindrical inner part 4. The inner part 4 is connected with the outer part 3 by two annular clearances 5 and 6 in the region of the end faces of the cylindrical insert 2, which has a collar 7 on its circumference. In the annular outer part 3, the collar 7 forms a partition which ascends spirally from a tangential inlet 8 approximately in a complete turn in the direction of the upper end face cover 1a of the receptacle 1. The cover 1a may form one piece with the receptacle 1. A tangential discharge outlet 9 is arranged at the bottom of the annular space 3. From below, a ventilating pipe 10 projects about halfway up into the receptacle 1. The ventilating pipe 10 is connected to the lower cover 11 which is detachably mounted on the receptacle 1.

The collar 7, in any convenient manner, sealingly engages the inner wall of the receptacle 1, for example with an elastic seal, or by welding, soldering, or gluing. It may, however, be sufficient to provide a sealing gap in this area. In order to axially hold the insert 2 in position, fastening elements 12 may be provided on the collar 7.

It is, of course, to be understood that the present invention is by no means limited to the specific showing in the drawings, but also comprises any modifications within the scope of the appended claims.

What I claim is:

1. An apparatus for separating gas from a fluid, which comprises in combination:

a hollow cylindrical receptacle, the ends of which respectively comprise cover means;

a hollow cylindrical insert located within said receptacle and in spaced relationship thereto so as to define respective first and second annular gaps axially above and axially below between the end portions of said insert and said cover means and so as to divide the interior of said receptacle into an annular outer section and a cylindrical inner section, said outer section being provided with a tangentially oriented inlet positioned therein for receiving said fluid and a tangentially oriented outlet positioned in the lower portion of the outer section below the inlet for withdrawing said fluid in a uniform rotating film on the inner wall of said insert to facilitate and reinforce removal of gas supplemental to centrifugal forces from below at said second annular gap;

a spirally ascending collar in said outer section and interposed between the inner wall of said receptacle and the outer circumference of said insert, said collar comprising a guiding surface thereon communicating with said inlet and following the spiral contour of said collar, said collar ascending upwardly in the direction of said first gap located axially there above and communicating therewith; and ventilating means communicating with said insert for withdrawing said gas from said receptacle with improved separation of gas from the fluid.

2. An apparatus in combination according to claim 1, in which said collar ascends in nearly a complete turn.

* * * * *